March 9, 1937. B. H. URSCHEL 2,073,035
TUBULAR AXLE
Filed March 4, 1936
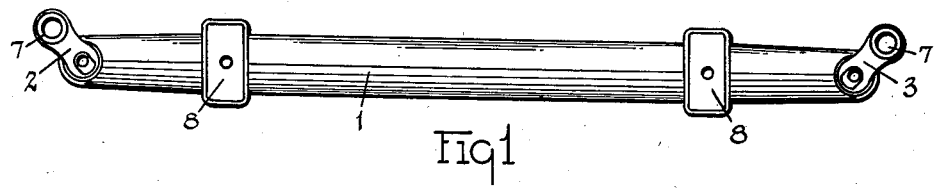
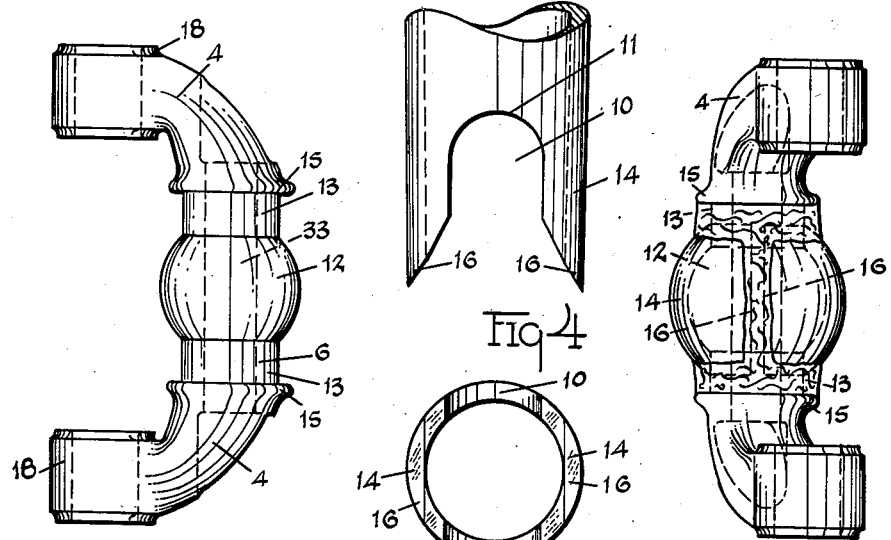
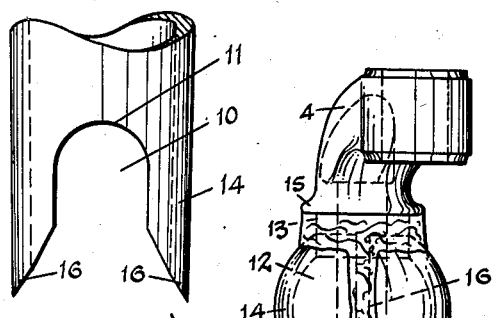
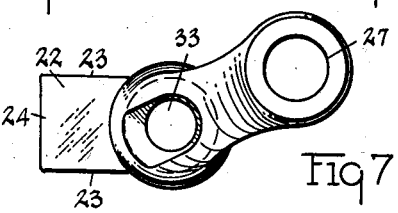
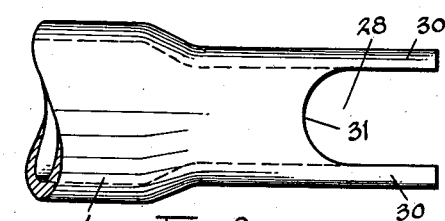
Inventor
Bertis H. Urschel
By Fred F. Crampton
Attorney Patented Mar. 9, 1937

2,073,035

UNITED STATES PATENT OFFICE 2,073,035

TUBULAR AXLE

Bertis H. Urschel, Bowling Green, Ohio

Application March 4, 1936, Serial No. 67,183

5 Claims. (Cl. 301—124)

My invention has for its object to provide an axle for a vehicle wherein the stub-axle bearings are located in advance of the points of connection of the axle to the vehicle.

The invention is advantageously applicable to automobiles and trucks wherein brakes are applied to the road wheels that direct the travel or movement of the vehicle.

In the ordinary construction, upon application of the brakes, the effect of the load pressure greatly advances, which reduces the pressure on the rear wheels and increases the pressure on the forward wheels, thereby producing a corresponding change in traction of the wheels of the car. This is due to the creation of a horizontal component of force caused by the change in the rate of movement of the car and its inertia. The yieldability of the springs also produces a material advance of the center of gravity, which magnifies the effect caused by the change in the rate of movement. The excess traction of the front wheels of the car frequently causes accidents. Also change in the effective pressures frequently produces reduction of the total possible effective traction that would otherwise be obtained if the pressure on the four wheels were maintained more nearly uniform.

The invention disposes the planes of the stub-axles, or more particularly the planes of the bearing surfaces of the stub-axles, in advance of the vertical plane of the points of connection of the main axle with the body of the vehicle. By this relative location of the stub-axles there is produced a counter-balancing moment to the torque that occurs when the brakes are operated to stop the car and to the torque produced by the forward motion of the car wheels and the inertia of the car body upon starting. The load on the main axle being located at a point remote and to the rear of the plane of the axes of the front wheels produces a moment of force that counter-acts the forward thrust occurring by reason of the inertia of the car upon the application of the brakes and prevents in a large measure the building up of the pressure of the load onto the front wheels. It maintains a more uniform distribution of the load on the four wheels and a more constant traction of each of the wheels during the braking of the car.

Location of the stub-axle bearings in advance of the vertical plane through the points of connection of the main axle with the vehicle also greatly reduces the torque on the main axle. The load on the main axle produces a moment equal to the product of the load and the distance between the stub-axle bearings and the said plane. The said distance may be such as to quite entirely eliminate the torque on the main axle caused by the operation of the brakes to stop the car. The said location of the stub-axle bearings also produces the advantage of extending the wheel base as well as reducing the torque on the main axle due to operation of the brakes. The invention thus enables an efficient, distributed braking action of the automobile which increases the safety of operation of the car.

The invention provides yoke members having stub-axle bearing surfaces that extend forwardly of the main axle to locate the bearing surfaces in a plane located in advance of the points of connection of the main axle with the vehicle. More particularly, the arms of the yokes are located in planes that are inclined to the vertical plane that extends through the points of connection of the main axle with the vehicle.

The invention also provides means for connecting the central parts of the yokes in slotted end parts of the main axle to enable ready location of the yokes, so as to position the bearing surfaces in advance of the plane of the points of the connection of the main axle with the chassis, the desired extent.

The invention may be contained in axle constructions that vary in their details and to illustrate a practical application of the invention, I have selected two forms of axle as examples of embodiments of the invention and shall describe them hereinafter. The axles selected are shown in the accompanying drawing.

Fig. 1 is a top view of an axle containing my invention. Fig. 2 illustrates a side view of a yoke having stub-axle bearing surfaces located in the arms of the yoke. Fig. 3 illustrates an end view of the axle shown in Fig. 1. Fig. 4 is a top view of an end part of the main tubular member to which yokes are connected. Fig. 5 illustrates an end view of the parts shown in Fig. 4. Fig. 6 illustrates a modified form of yoke. Fig. 7 illustrates a top view of the yoke illustrated in Fig. 6. Fig. 8 illustrates a top view of an end portion of the tubular part of the axle shaped to receive the yoke illustrated in Fig. 6.

The axle comprises a steel tube 1 and a pair of yokes 2 and 3 secured in the ends of the tube 1. By reason of the tubular shape of the main part of the axle, it has the maximum torque resisting strength and consequently is advantageous when used to connect the front wheels with the vehicle when they are provided with brakes.

The yoke members 2 and 3 are each provided with the arms 4 that protrude from the central part 6, so as to project beyond the end portions of the main tubular axle 1. The ends of the arms are provided with bearing surfaces 7 in which king pins that extend through stub-axles may be located in the manner well known in the art for connecting wheels to the main axle and enable angular movement of the wheels about the axes of the stub-axle bearing surfaces 7 to direct the movement of the travel of the vehicle. The tubular axle 1 may be provided with spring pads 8 that may be connected to the springs of the vehicle, whereby the body of the vehicle may be resiliently supported on the axle.

The arms of the yokes 2 and 3 are secured in the tubular member 1 by forming the slots 10 in opposite sides of each of the end parts of the tubular member. The slots have end edges 11 that are semi-circular and fit the central part 6 of the yoke. In the form of yokes shown in Figs. 2 and 3, the central part of the yoke has a substantially spherical surface 12 and the substantially cylindrical surfaces 13. The cylindrical surfaces 13 fit the semi-circular edges 11 of the slots 10, while the spherical surfaces 12 substantially fit the portions 14 located intermediate the slots 10. Preferably the ends of the portions 14 are circular and the end portions 16 are beveled as indicated in Fig. 4. The ends of the portions 14 may be drawn to extend curvedly so that when the portions 14 are wrapped around the central part 6 of the yoke, the end edges 16 of the portions 14 will be substantially located in planes parallel to the axis of the central portion 6 of the yoke. The edges of the end parts of the tubular member may then be welded to the proximate surfaces of the yoke.

The yokes 2 and 3 may also be provided with flange portions 15 located at the ends of the curved central part 6. If desired, the arms 4 may be tapered from the flanges 15 to the bosses or enlargements 16 in which the bearing surfaces 7 are located.

If desired, yokes of the form shown in Fig. 6 may be secured in the ends of the tubular member 1. Each of the yokes 17 has a central cylindrical part 21 and a protruding lug 22 having preferably parallel sides 23 and curved top and bottom surfaces 24. The lug protrudes in a direction inclined to the plane of the arms 26 of the yoke. The arms are also provided with bearing surfaces 27 in their ends.

The end parts of the axle may be formed substantially rectangular and to have inner surfaces that conform to the surfaces of the lugs 22 of the yokes 17. The top and bottom of each end part may be slotted as at 28 to form substantially parallel side walls or portions 30 located intermediate the slots 28, and a curved edge 31 located at the ends of each of the slots that substantially fits the upper and lower end parts of each of the cylindrical surfaces 21 of the yokes 17. When the lugs 22 and the central parts of the yokes 17 are located within the ends of the tubular member 1, their surfaces fit the corresponding interior surfaces of the end parts of the main axle member 1 and locate the planes of the arms of the yokes in an inclined relation to a vertical plane that extends through the ends of the tubular member 1. The portions 30 intermediate the slots 28 may then be wrapped about the cylindrical surfaces 21 of the yokes, and the edges of the portions of the tubular axle member 1 may be welded to the contiguous surfaces of the yokes. The ends of the central cylindrical parts 21 may be provided with the flanges 15, and the arms 26 may be tapered in form and extend to the bosses 18 in which the bearing surfaces are located.

Each of the yokes 2, 3, and 17 may be provided with an opening 33 that extends through the central part of the yoke to produce intimate contact of the interior surfaces of the tubular member with the corresponding exterior surfaces of the yokes, notwithstanding the heat treatment to which the metal of the axle is subjected to produce the required hardness. It enables interior chilling, together with the exterior chilling. The interior portions of the connected parts of the axle are thus cooled with the cooling of the exterior portions of the said parts, which contributes to rigidity of structure and prevents any play which might otherwise in time produce a fracture of the axle.

I claim:

1. In an axle for a vehicle comprising a main axle having a part connected to the vehicle and having a pair of yokes, the arms of the yokes having stub-axle bearing surfaces and extending forwardly to locate the bearing surfaces in spaced relation to a plane of the part of the axle connected to the vehicle.

2. In an axle for a vehicle comprising a main axle having a pair of stub-axle cylindrical bearing surfaces, and means for connecting the main axle to the vehicle at spaced points, the axle having means for locating the axes of the bearing surfaces in forwardly spaced relation to the vertical plane extending through the said points when the main axle is connected to the vehicle.

3. An axle for a vehicle comprising a main axle having a pair of stub-axle bearing members and parts spaced from each other for connecting the main axle to the vehicle, the bearing members having cylindrical bearing surfaces, and means for locating the axes of the bearing surfaces in forwardly spaced relation to the portion of the main axle member between the said parts when the axle is connected to a vehicle.

4. In an axle for a vehicle comprising a main axle having a pair of yokes, the ends of the arms of the yokes having stub-axle bearing surfaces and the arms located in planes inclined forwardly with respect to a vertical plane extending through the central parts of the yoke when the axle is connected to the vehicle.

5. In an axle for a vehicle comprising a pair of yokes, the arms of the yokes having bearing surfaces, the central parts of the yokes having curved surfaces, a tubular member having slots formed in opposite sides of the end portions of the tubular member and substantially fitting the curved surfaces of the yokes, the side portions intermediate the slots wrapped around the curved surfaces and the edges of the said side portions welded to the central parts of the yokes, the central parts of the yokes having lugs projecting endwise into and substantially fitting the interior of the end portions of the tubular member, the said lugs inclined to the planes of the arms of the yokes to locate the arms of the yokes in planes that are inclined to planes extending through the ends of the tubular member to locate the bearing surfaces in advance of the vertical plane extending through the ends of the tubular member when connected to the vehicle.

BERTIS H. URSCHEL.